United States Patent
Döring-Freissmuth

(10) Patent No.: US 9,187,792 B2
(45) Date of Patent: Nov. 17, 2015

(54) AGENT FOR TREATING MOLTEN METALS, METHOD FOR THE PRODUCTION AND USE THEREOF

(75) Inventor: Mechthilde Döring-Freissmuth, Grabenstätt (DE)

(73) Assignee: Alamamet GmbH, Ainring (DE)

( * ) Notice: Subject to any disclaimer, the term of this patent is extended or adjusted under 35 U.S.C. 154(b) by 143 days.

(21) Appl. No.: 13/978,963

(22) PCT Filed: Jan. 11, 2012

(86) PCT No.: PCT/EP2012/050397
§ 371 (c)(1),
(2), (4) Date: Sep. 17, 2013

(87) PCT Pub. No.: WO2012/095471
PCT Pub. Date: Jul. 19, 2012

(65) Prior Publication Data
US 2015/0033911 A1    Feb. 5, 2015

(30) Foreign Application Priority Data

Jan. 15, 2011  (DE) .......................... 10 2011 008 690
Jan. 15, 2011  (DE) .......................... 10 2011 008 691

(51) Int. Cl.
C21C 1/00      (2006.01)
C21C 7/06      (2006.01)
C21C 1/02      (2006.01)
C21C 7/064     (2006.01)

(52) U.S. Cl.
CPC .............. *C21C 1/025* (2013.01); *C21C 7/0645* (2013.01)

(58) Field of Classification Search
CPC .............................. C21C 1/025; C21C 7/0645
See application file for complete search history.

(56) References Cited

U.S. PATENT DOCUMENTS

| | | | |
|---|---|---|---|
| 2,863,755 A | 12/1958 | Kurzinski | |
| 3,598,573 A | 8/1971 | Takemura | |
| 3,876,421 A | 4/1975 | Takemura | |
| 4,374,664 A | 2/1983 | Mitsuo et al. | |
| 4,592,777 A | 6/1986 | Rellermeyer et al. | |
| 4,943,317 A | 7/1990 | Lischka et al. | |
| 5,284,504 A | 2/1994 | Barker et al. | |
| 5,358,550 A * | 10/1994 | Rossborough | 75/533 |

FOREIGN PATENT DOCUMENTS

| | | |
|---|---|---|
| CN | 1528919 A | 9/2004 |
| DE | 1758250 B1 | 10/1971 |
| DE | 2243862 A1 | 3/1974 |
| DE | 2252796 A1 | 5/1974 |
| DE | 2355736 A1 | 5/1974 |
| DE | 3831831 C1 | 11/1989 |
| EP | 0005124 A2 | 10/1979 |
| EP | 0164592 A1 | 12/1985 |
| JP | 2005146333 A | 6/2005 |
| KR | 890000157 B1 * | 12/1986 |

OTHER PUBLICATIONS

CN 1528919 A published Sep. 15, 2004. Machine translation.*
Kim, et al. Patent KR 890000157 B1 published Dec. 1986. Machine translation.*
Franz Oeters, Metallurgie der Stahlherstellung, 1989.
Robey, R. et al., "Tailored solutions for hot metal pretreatment," *Steelmaking*, MPT International, Jun. 2013, pp. 34-38.

* cited by examiner

*Primary Examiner* — George Wyszomierski
*Assistant Examiner* — Tima M McGuthry Banks
(74) *Attorney, Agent, or Firm* — Dinsmore & Shohl LLP; Weston R. Gould

(57) ABSTRACT

The invention relates an agent for treating molten metals, in particular for dephosphorizing pig iron melts, containing at least calcium oxide, optionally at least one other element in the elementary and/or bound state, selected from the group including alkali metals, alkaline earth metals or earth metals and bitumes in an amount between 1-30 wt.-% or a mineral oil and/or paraffin oil, in an amount between 1-25 wt. %. The agent is suitable, in particular, for treating pig iron melts, according to a mono-, co- or multi-injection method, but also for stirring, for example, according to the KR stirring method.

23 Claims, No Drawings

AGENT FOR TREATING MOLTEN METALS, METHOD FOR THE PRODUCTION AND USE THEREOF

CROSS-REFERENCE TO RELATED APPLICATIONS

This application is the U.S. National Phase of PCT/EP2012/050397 filed Jan. 11, 2012, which claims priority of German Patent Applications 10 2011 008 690.0 and 10 2011 008 691.9 filed Jan. 15, 2011.

The invention relates to an agent for treating molten metals, in particular pig iron melts, to a method of producing an agent for treating molten metals and to the use of an agent for treating molten metals.

The pig iron produced in smelting furnaces, in cupola furnaces or in other systems and foundry iron contain contents of sulfur and phosphorus for operation and process reasons which have to be reduced before the processing to steel or cast iron to be able to set the required contents in the end product. S contents <0.0020% (20 ppm) and P contents <0.005% (50 ppm) are frequently required.

Mixtures based on calcium oxide, magnesium carbide and calcium carbide have established themselves as desulfurization agents since they result per se in good desulfurization of the pig iron and in low final sulfur contents. A desulfurizing agent is, for example, known from DE 17 58 250 which is composed of a mixture of 40 to 90% by weight technical grade calcium carbide and calcium carbonate and 2 to 20% by weight carbon distributed therein, with the fine-particle calcium carbonate/carbon mixture being known under the trade name Diamidkalk (diamide lime). These mixtures have the disadvantage, however, that the slag arising by the desulfurization treatment after the air blowing procedure includes considerable amounts of iron, which results in substantial iron loss. A certain overdosage must take place with respect to the risk of back sulfurization to compensate this effect. The metallurgic efficiencies of these mixtures with diamide lime are limited at approximately 25%.

It is desirable with respect to the costs of the individual additives to provide a portion of above all calcium oxide in the mixtures which is as high as possible. Calcium oxide, however, contributes comparatively little to the desulfurization in comparison with magnesium and calcium carbide in the operational use of the desulfurization agents since silicon always present in the iron melt at least partly oxidizes in the course of the desulfurization and a silicate is formed having the formula $2\,CaO.SiO_2$ or $3\,CaO.SiO_2$. These complexes form an enveloping layer on the calcium oxide grain which impedes the diffusion of the sulfur from the melt to the calcium oxide grain and inhibits the bonding of the released sulfur. The potential of the inexpensive calcium oxide as a desulfurization agent is thereby restricted. (Lit. F. Deters, Metallurgie der Stahlherstellung [Metallurgy of Steel Production], Springer 1989, p. 329).

It is known from U.S. Pat. No. 4,374,664 to use powdery aluminum in addition to calcium oxide since in this respect calcium aluminates are preferably formed instead of the calcium silicates. These aluminates are as a rule liquid at temperatures of pig iron desulfurization and should have a solubility for sulfur. The diffusion of the sulfur ions to the surface of the calcium oxide grain is facilitated. This concept has the disadvantage that up to 15% by weight aluminum powder is required, with respect to the calcium oxide use. This aluminum powder is only partly effective for the intended purpose since the unprotected aluminum can react with other components in the melt. In addition, a separation (segregation) of the aluminum powder from the mixture with calcium oxide can be expected in the pneumatic conveying. The fine-grained aluminum also impairs the commercial viability of the desulfurization due to the costs.

The addition of polymers to the desulfurization agents is proposed in DE 22 52 796. This concept cannot establish itself since polymers cannot simply be comminuted together with the desulfurization agents and because demixings cannot be avoided in the pneumatic transport into the metal bath. In addition, lance clogging is unavoidable.

It is the object of the present invention to avoid the disadvantages of the prior art and to improve the properties of the known agents for treating molten metals, in particular pig iron melts, for example for desulfurization. It is in particular the object of the invention to achieve targeted low contents of unwanted elements of above all sulfur, phosphorus, silicon and oxygen and to ensure the reactivity of especially reactive metals such as calcium, magnesium, aluminum or rare earth metals and alloys of reactive metals as well as of alkaline compounds such as soda or sodium silicate ($Na_2O.SiSO_2$ in a ratio of 1:1) on the use as agents for treating molten metals, in particular in steel metallurgy or foundry metallurgy, i.e. to avoid or overcome inhibiting phases forming during the treatment, but also optionally to slow down the reaction to achieve a conversion rate which is as high as possible. Furthermore, the agents should be easy to handle and have a good flowing and pneumatic conveying behavior.

The object is satisfied by an agent for treating molten metals, in particular for the desulfurization of pig iron melts, at least containing calcium oxide, optionally at least one further element in an elementary and/or bound state, selected from the group of alkaline metals, of alkaline earth metals or of earth metals and bitumen in a quantity of 1 to 30% by weight or a mineral oil and/or paraffinic oil, in a quantity of 1 to 25% by weight.

The addition of a petroleum derivative, in particular the addition of bitumen and/or of mineral oil and paraffinic oil to an element in the elementary and/or bound state, selected from the group of alkaline metals, alkaline rare metals or earth metals, preferably to calcium oxide, CaO, surprisingly results in a very effective desulfurization agent. With the agent for treating molten metals in accordance with the invention, <0.003% by weight S is reached or kept below on the desulfurization.

It was surprisingly also found that for process reasons the agent for treating molten metals in accordance with the invention, in particular for the desulfurization of pig iron melts, is not carried to the surface of the melt where it burns off unused or remains stuck in the slag from the melt system or developed by the treatment before the development of the desired effect by the natural buoyancy or the expanding carrier gas bubbles.

The agent in accordance with the invention for treating molten metals is preferably mixed with an element in an elementary and/or bound state, selected from the group of alkaline metals, alkaline earth metals or earth metals, particularly preferably with calcium oxide, CaO and/or $Ca(OH)_2$, and is milled to the respectively required grain size, in particular from <0.1 to 1 mm.

The hydrogen released from the petroleum derivatives, in particular from bitumen and mineral oil and/or paraffinic oil, is present in atomic form or in statu nascendi for a specific time after the pyrolysis. This hydrogen is more intense in the total effect than gases, for example from the steam reforming process. The released carbon from the pyrolysis of the hydrogen carrier is presumably present in atomic form.

Paraffins and/or paraffinic oils can be added to the agents in accordance with the invention during their treatment, in particular during the milling. They not only effect an increase in the desired metallurgic effect, but are also characterized as flow improvers for the agent in accordance with the invention.

In a preferred embodiment, the agent in accordance with the invention for treatment molten metals, in particular for the desulfurization of pig iron melts, contains at least calcium oxide, optionally at least one further element in an elementary and/or bound state, selected from the group of alkaline metals, alkaline earth metals or earth metals (first component) and bitumen in a quantity of 1 to 30% by weight.

The agent optionally contains at least one further element in an elementary and/or bound state selected from the group calcium carbide, calcium cyanamide, calcium hydroxide, calcium carbonate, calcium sulfate, dolomite, barium oxide, barium sulfate and alkaline carriers (second component).

Alkaline carbonates and alkaline sulfates selected from sodium carbonate and potassium carbonate or sodium sulfate and potassium sulfate can be named as preferred alkaline carriers, in addition to or instead of hydroxides, selected from sodium hydroxide and potassium hydroxide, as well as minerals of the foid group such as albite, nepheline syenite or sodalite.

It was surprisingly found that, in contrast to other compounds containing carbon, such as coal, bituminous coal, graphite, urea or rubber, bitumen does not contain any technical safety risks and that a desulfurization agent in accordance with the prior art can easily be mixed or baked with bitumen and this mixture or the plate can finally be comminuted to a blowable or shakable grain.

In addition, an improved desulfurizing effect can be determined of an element in the elementary and/or bound state, selected from the group of alkaline metals, alkaline earth metals or earth metals, which optionally contains at least one further element in the elementary and/or bound state selected from the group calcium oxide, calcium carbide, calcium cyanamide, calcium hydroxide, calcium carbonate, calcium carbonate, calcium sulfate, dolomite, barium oxide, barium sulfate and alkaline carriers.

It was also found that the flow capability of the agent in accordance with the invention is fully maintained at the usual environmental temperatures. The effect of known agents for improving the flow capability, for example silicone oils, of the agents for treating molten metals, e.g. calcium oxide, is not influenced. However, paraffinic and mineral oil products such as refinery light oils with a small dynamic viscosity also improve the flowability of the agent in accordance with the invention, in particular of the fine-grained components.

As initially mentioned, calcium oxide only has a brief very good desulfurizing effect at the start of an air blowing treatment since a layer (e.g. as $CaSiO_4$) forms around the calcium oxide grain which inhibits the diffusion of the sulfur to the calcium oxide. It has now been found that a hydrogen phase from the pyrolysis (degradation) of the petroleum derivative is formed around the calcium oxide grain during the desulfurization using the agent in accordance with the invention. The released hydrogen and carbon constantly reduce the calcium sulfide layer on the calcium oxide grain such that exposed calcium oxide or calcium can have a strong desulfurizing effect. It has further been found that the degradation products of the bitumen not only release calcium from calcium oxide, but also barium from baryte and strontium from celestine at the temperatures of the liquid pig iron.

Within the framework of this invention, bitumen is understood as a dark-colored multicomponent mixture of organic substances which is manufactured from petroleum by vacuum distillation, which is of low volatility and comprises high-molecular, long-chain, aliphatic and aromatic hydrocarbon compounds. The properties of the different types of bitumen are determined by special test processes. They are laid down in the DIN standards (European Standard EN 12591) for paving road bitumen (softening point R&B (EP R&B), Frass breaking point, needle penetration). The physical properties can be directly varied by the addition of further components. Bitumen sorts are preferably used for this metallurgic work which contain a low sulfur content, in particular less than 1.5% by weight.

The invention also relates to a method of producing an agent for treating molten metals, in particular for the desulfurization of pig iron melts, which is characterized in that an element in an elementary and/or bound state, selected from the group of alkaline metals, of alkaline earth metals or of earth metals (first component) and optionally at least one further element in an elementary and/or bound state selected from the group calcium oxide, calcium carbide, calcium cyanamide, calcium hydroxide, calcium carbonate, calcium sulfate, dolomite, barium oxide, barium sulfate and alkaline carriers are mixed with bitumen and are subsequently crushed to the size of a shakable grain or are milled to blowable grains.

A first component, or optionally a mixture of a plurality of components, for example of a first and a second component and bitumen, is milled to the size of a blowable grain at a temperature of 30 to 100° C., particularly preferably at a temperature of 60 to 80° C. These temperatures are achieved by a common milling by the milling work. It has namely been found that a particularly good adhesion arises between the individual components and bitumen at these temperatures. An integration of the bitumen into a first component, for example into calcium oxide or into a mixture of individual components, is thereby made possible as a type of envelope or coating. In this respect, a bitumen should preferably be used which has a softening point of at least >70° C.

It is particularly preferred to mix a first component, optionally already milled, and, optionally, a further (first and/or second) component using suitable stirring units (e.g. dual-shaft machines) with liquefied bitumen in order finally to crush or mill the plates formed after the pouring out of the mixing machine and the solidifying. In accordance with the screening standards, the components will preferably be <1.0 mm. A grain of <1.0 mm in the bitumen composite has good flow properties.

To avoid a demixing of the components, optionally to be produced singly, or mixtures in the conventional method of desulfurization, desulfurization is preferably carried out using the co-injection technology or multi-injection technology. In this respect, the mixing of the individual components or mixtures only takes place in the pipeline on the way to the lance. The production of the agent in accordance with the invention succeeds so-to-say in situ as part of the co-injection by a mixing among one another a) of a first blowable component, for example calcium oxide, and optionally of a further component or other slag components; and b) blowable, (fine-)grained bitumen in the blowing lance.

I.e. a first component, for example calcium oxide or mixtures thereof, comes from a container (dispenser) which is usually larger and the blowable, fine-grained bitumen comes from a second blowing container.

In an embodiment, an agent in accordance with the invention containing bitumen and optionally a further first or second component as blowable grain is present on the one side and blowable calcium oxide on the other side. Alternatively, an agent in accordance with the invention containing calcium oxide and bitumen and optionally a further first or second component as blowable grain is present on the one side and an alkaline carrier such as albite or nepheline syenite on the other side.

A particularly preferred embodiment of the agent for treating molten metals, in particular for the desulfurization of pig iron melts and for the reduction of ores, contains bitumen in a quantity of 1 to 30% by weight and calcium oxide.

In the same way, other reactive metals and alloys such as aluminum, titanium (ferro titanium), rare earth metals, boron (ferro boron) are mixed with bitumen with the consequence that their yield is improved. The inoculating effect of an agent which is expensive per se can thus be increased. The customary very complex and/or expensive wire packing ("filling wire") of these metals or compounds can be dispensed with.

The production of the agent in accordance with the invention in this respect advantageously takes place in a similar manner to the manufacture of asphalt in that a first component, for example calcium oxide is admixed to liquid bitumen, optionally while adding a second component, for example nepheline syenite, and is stirred in. Subsequently, plates are cast and are then comminuted or milled.

Since only limited quantities of bitumen have to be admixed, it is also conceivable to mix a first component, for example a metallurgically active component such as calcium oxide, with a correspondingly fine-grained bitumen granulate. The introduction into the molten metal can then take place using the mono-process, i.e. work is only carried out with one blowing unit.

The invention further relates to the use of an agent for treating molten metals, in particular pig iron melts, for desulfurization by blowing in, stirring in or adding a small-piece form into a treatment vessel.

To achieve this, the metallurgic conditions have to be satisfied, for example the oxidizing state in the dephosphorization. This does not preclude that the components in accordance with the invention can also be used very successfully under reducing conditions. An agent in accordance with the invention containing a first component, for example calcium oxide, a further component, in particular an alkaline carrier having 10-15% by weight, for example $Na_2O$ and bitumen having 2 to 30% by weight, is suitable for this purpose.

In the customary desulphurization of pig iron, the effect of a treatment is influenced by silicon. It is oxidized before the phosphorus; no oxygen is available to bind the phosphorus. A silicate layer forms around the calcium oxide grain under these oxide conditions. The debinding of the oxygen by the elements of the bitumen is "faster" than the debinding by silicon. It has been found that a dephosphorization of pig iron can take place without (or with only limited) oxidation of the silicone. The calcium oxide is effective "longer" and debinds more phosphorus. In a further use in accordance with the invention of the agent for treating molten metals, in particular pig iron melts, a dephosphorization can run under basic or "close to basic" conditions.

The invention further relates to the use of an agent in accordance with the invention for treating molten metals, in particular pig iron melts, for dephosphorization by blowing in, stirring in or adding a small-piece form into a treatment vessel.

In a further preferred embodiment, the agent in accordance with the invention for treating molten metals, in particular for the desulfurization of pig iron melts, contains at least calcium oxide, optionally at least one further element in an elementary and/or bound state, selected from the group of alkaline metals, alkaline earth metals or earth metals (first component) and bitumen and a mineral oil and/or paraffinic oil in a quantity of 1 to 25% by weight (oil portion).

The agent optionally contains at least one further element in an elementary and/or bound state selected from the group calcium carbide, calcium cyanamide, calcium hydroxide, calcium carbonate, calcium sulfate, dolomite, barium oxide, barium sulfate.

The named oils release hydrogen and presumably also carbon on pyrolysis from approximately >350° C. in statu nascendi. The effect of the reactive hydrogen from the pyrolysis of the oil can be seen here. CaO thereby becomes a very effective desulfurization agent and also, under corresponding (oxidizing) conditions, a very effective agent for dephosphorization.

The kinetics of the conversion process is accelerated. On a use of the oils in accordance with the invention, the temperature of the pig iron or of the metal bath does not play any noticeable role for the desulfurization. For the pyrolysis of the oil is over at temperatures of <1100° C. and the active element of hydrogen and carbon can also release the calcium from the CaO or $Ca(OH)_2$ and can release further active components or elements at these temperatures.

Within the context of this invention, mineral oils are understood as oils which are acquired from petroleum or coal. This in particular includes normal, light and extra-light heating oil, diesel fuel and kerosene. In accordance with the invention, a high portion of saturated alkalines is preferred since a high portion of hydrogen is in particular desired for the pig iron treatment and an additional introduction of carbon into the melt is not wanted.

Paraffinic oils are understood as pure saturated hydrocarbons having the general sum formula $C_nH_{2n+2}$.

Since agents for treating molten metals are as a rule removed from a conveying vessel by way of so-called monoinjection and are blown into the pig iron melt via a refractory blowing lance using a transport gas, the agent in accordance with the invention has to be blowable, slidable and pourable.

It is therefore important that the agent is fine-grained and blowable. This is achieved in that at least a large portion of the mineral oil and/or paraffinic oil is received by the calcium oxide in a capillary surface structure and optionally in the surface structure of a further component containing calcium or alkali. In particular calcium oxide in this respect serves as an adsorbent for mineral oil and/or paraffinic oils (adsorbate).

The ideal oil portion has to be determined for every agent in accordance with the invention for treating molten metals. This forms part of the craft of the skilled person. As a result, after the addition of oil the agent in accordance with the invention must be blowable, pourable and slidable with respect to the selected type of oil and to the state of the calcium oxide and the further components.

The oil portion to be used therefore depends on at least two parameters, namely on the composition of the agent comprising calcium oxide as a soft-burnt lime, medium-burnt lime or hard-burnt lime and optionally a further component containing calcium or alkali as well as on the type and viscosity of the oil or oil mixture. The saturation value, i.e. the Langmuir adsorption isotherms, can be determined for a specific oil or for a specific oil mixture by simple experiments with the respective adsorbent, i.e. with calcium oxide and optionally with a further component containing magnesium or alkali. A guideline for soft-burnt lime as an adsorbent, for example, and heating oil (HEL) as an adsorbate is 3.5 to 11.5% by weight.

It was also found that the flow capability of the agent in accordance with the invention is fully maintained at the usual environmental temperatures. The known agents for improving flowability, for example, silicone oils, can be omitted. Paraffinic and mineral oil products such as refinery light oils with low kinematic viscosity improve the flowability of the agent in accordance with the invention, in particular of the fine-grained components, but also the coarser grains, e.g. of 0.01-2.5 mm, for the use in stirrer processes.

As initially mentioned, calcium oxide only has a briefly very good desulfurizing effect at the start of a blowing treatment since grained burnt lime can sinter at the temperatures present. This has the result that the active surface is reduced in size. An agent in accordance with the invention does not show any such sintering, whereby the long-lasting desulfurization as well as the smaller or missing back sulfurization tendency of the agent in accordance with the invention can be explained.

The production of an agent in accordance with the invention takes place, for example, by mixing or spraying of CaO and optionally of a further component containing calcium and/or alkali with a mineral oil and/or paraffinic oil. The agent in accordance with the invention is optionally subsequently screened to achieve a uniform grain size.

Mineral oils having a kinematic viscosity of approximately 2.0 to 4.5 mm$^2$/s have proved to be exceptionally suitable. This addition is in particular preferred with soft-burnt lime since the dust development is substantially reduced and the absorption capability of the lime is very pronounced.

A spraying of soft-burnt lime with mineral oil and/or paraffinic oil directly after the firing also proves to be particularly advantageous since a hydration of the CaO can thereby be prevented. CaO with this oil addition immediately after the emptying makes it possible to use this lime for treatments in ladle metallurgy without risking an increase in the water content. Optionally, the oil portion in a mixer is subsequently further increased.

The invention further relates to the use of an agent for treating molten metals, in particular pig iron melts, for desulfurization by blowing in, stirring in or adding a small-piece form into a treatment vessel or transfer ladle.

Preferred embodiments of the invention will be explained in more detail and the performance capability of the agent in accordance with the invention will be illustrated with referenced to the following examples.

The so-called alpha relationship will be used for showing an achieved degree of desulfurization since this delivers an illustrative value in that it indicates the quantity of treatment agent in kg per ton of pig iron which is required to lower the sulfur content by 0.010% by weight.

$$\alpha = \frac{\text{Consumed (desulfurization) agent}}{(S(\text{start})\% \text{ by weight} - S(\text{end})\% \text{ by weight}) \cdot 100}$$

Unit of $a$ = kg/t × 0.010 % $S$

Example 1

Comparison Example

In a standard experiment in accordance with the prior art, 13.6 kg/t calcium oxide with an addition of 5% by weight CaF$_2$ was blown in via a lance using the carrier gas nitrogen into an open ladle with 175 t pig iron by means of mono-injection. The sulfur content S$_a$ (S(start)) determined before the treatment was 0.041% by weight. After the treatment, a sulfur content S$_e$ (S(end)) of 0.007% by weight was determined, from which an a value of 4 is calculated.

Example 2

Bitumen

In an experiment, 4.2 kg/t calcium oxide containing 5.0% by weight bitumen was blown in via a lance using the carrier gas nitrogen into an open ladle with 170 t pig iron by means of mono-injection. The agent containing calcium oxide and bitumen was previously milled to the size of a blowable grain at a temperature of 60° C. The sulfur content (S(start)) determined before the treatment was 0.040% by weight. After the treatment, a sulfur content (S(end)) of 0.0030% by weight was determined, from which an a value of 1.07 is calculated.

Example 3

Bitumen

In an experiment, 30 kg/t calcium oxide on the one side and 0.7 kg/t of an agent containing 81% by weight bitumen granulate and 19% by weight calcium oxide on the other side was blown in via a lance using the carrier gas nitrogen into an open ladle with 170 t pig iron by means of co-injection. The sulfur content (S(start) determined before the treatment was 0.044% by weight. After the treatment, a sulfur content (S(end)) of 0.0020% by weight was determined, from which an a value of 0.86 is calculated.

Example 4

Bitumen

In a trial, 3.2 kg/t of an agent containing 94% by weight calcium oxide and 6% by weight bitumen was stirred into a ladle with 310 t pig iron using a KR stirring system. The agent had previously been produced by mixing and milling the individual components. The grain size was <2 mm. The sulfur content (S(start) determined before the treatment was 0.055% by weight. After the treatment, a sulfur content (S(end)) of 0.002% by weight was determined, from which an a value of 0.60 is calculated.

The performance capability of the agent in accordance with the invention becomes clear from the comparison of the a values from examples 2 to 4 with the a value from the standard example 1. The a value can thus be lowered by 60 to 85%, which is directly reflected in the consumed desulfurization agent and thus in the costs. The agent in accordance with the invention is suitable for treating molten metals, in particular pig iron melts, using the mono-injection process, co-injection process or multi-injection process, but after stirring in, e.g. using the KR stirring system.

Example 5

Bitumen

Two 3% by weight of a bitumen are added to a calcium oxide (CaO) prepared for blowing in and are milled together. The blowing quantity in this series of experiments was maintained the same as in the customary treatments. It was surprisingly found that the end sulfur content was on average 20 to 35 ppm instead of the <50 ppm aimed for. The silicon content remained unchanged. A follow-up blowing was not necessary.

Example 6

Bitumen 6 a) Approximately 5% by weight bitumen in a solid state was added to calcium oxide with 10% by weight albite. This mixture was milled to a blowable grain size. The desired S content in the usual use of lime fluorite mixture was <70 ppm. 20-30 ppm sulfur was achieved in the treated pig iron by the addition of bitumen. It was investigated in this series of experiments by how much the blowing quantity can be reduced while still achieved the required 70 ppm. It is successful on a reduction of the planned blowing quantity by approximately 20%.

6 b) By the use of lime and tinder or another oxygen carrier with 2.5 to 10% by weight bitumen, it was possible to lower the phosphorus content of 600 to 900 ppm by two-thirds, to 200 to 300 ppm, using the blowing process in the loading ladle. Lower phosphorus contents can be achieved by a simple increasing of the added quantity on blowing or stirring. The added quantity of bitumen depends on the phosphorus starting content and on the desired end content.

6 c) A composite of nepheline syenite and bitumen, and optionally with lime, can effectively reduce the phosphorus content in pig iron via blowing, preferably with air. The use of sodium silicate $Na_2O.SiO_2$ in a ratio of 1:1 in conjunction with bitumen and lime (CaO) is particularly effective; this complex with 3-5% by weight bitumen results in a smooth treatment course in pig iron, but also in cast iron. The reduction in the phosphorus content amounts to 50 to 80% on the treatment in the transfer ladle; the specific consumption figures were between 5 and 10 kg/t depending on the starting content and the desired end content.

6 d) An addition of bitumen to inoculating agents for spheroidal cast iron or vermicular cast iron can surprisingly reduce the decay effect of the inoculating alloy. Bitumen in particular extends the inoculating effect with inoculating agents having contents of rare earths in addition to the usual components. Additions of 0.3 to 1.0% by weight are sufficient depending on the size of the cast piece. The inoculation effect can be further increased on the addition to the bitumen of a sulfate, carbonate and/or oxide of the inoculation-active metals such as barium, strontium, magnesium, calcium or aluminum, in particular barium sulfate (baryte), calcium sulfate (gypsum), strontium sulfate (celestine). 1.0 to 1.5% by weight is sufficient here which can preferably be worked into the liquid bitumen. The metallurgic relationships for this reinforcement or extension of the inoculation effect are not securely known. The experiments have, however, surprisingly shown that the metal compounds can be used solely for the inoculation of cast iron when they were enveloped (coated) with bitumen (in a liquid state) or adhere to one another by mechanical treatment (milling). What is decisive is the preparation of the corresponding grain size which can fluctuate from 0.2 mm to 6 mm depending on the treatment size.

If the operating conditions allow, petroleum or derivatives from the processing of petroleum can also be used instead of bitumen. The selection as to which oil or which C—H compound from coke production or other carbonizing processes is used must be individually determined.

6 e) A mixture of calcium oxide and bitumen is very suitable for the desulfurization of flue gases such as from the coking of coal or from sulfur-rich fuels such as petroleum in annealing furnaces. The bitumen immediately releases calcium at a corresponding temperature, which binds sulfur from the flue gas. Accordingly, the agent in accordance with the invention can also be used for the desulfurization in accordance with the invention of flue gases.

Example 7

In an experiment, 4.1 kg/t calcium oxide having an oil portion (heating oil HEL) of 4.1% by weight was blown in via a lance using the carrier gas nitrogen into an open ladle with 270 t pig iron by means of mono-injection. The blowing rate was 54 kg/min. The sulfur content $S_a$ determined before the treatment was 0.047% by weight. After the treatment, a sulfur content $S_e$ of 0.002% by weight was determined, from which an a value of 0.91 is calculated.

Example 8

In an experiment, 4.2 kg/t calcium oxide having an oil portion (petroleum) of 4.8% by weight was blown in via a lance using the carrier gas nitrogen into a ladle having a cover with 245 t pig iron by means of mono-injection. The blowing rate was 48 kg/min. The sulfur content $S_a$ determined before the treatment was 0.039% by weight. After the treatment, a sulfur content Se of 0.003% by weight was determined, from which an a value of 1.1 is calculated.

Example 9

In an experiment, 5.35 kg/t of a mixture of 35% by weight calcium oxide and 59% by weight calcium hydroxide having an oil portion (diesel oil) of 6% by weight was blown in via a lance using the carrier gas nitrogen into an open ladle with 210 t pig iron by means of mono-injection. The sulfur content $S_a$ determined before the treatment was 0.054% by weight. After the treatment, a sulfur content $S_e$ of 0.005% by weight was determined, from which an a value of 1.16 is calculated.

Example 10

The effect of a treatment with an agent in accordance with the invention was tested in a ladle with 210 t pig iron to see the extent to which the content of sulfur and phosphorus can be lowered in the course of a treatment.

The sulfur content $S_a$ determined before the treatment was 0.042% by weight; the phosphorus content $P_a$ determined before the treatment was 0.072% by weight. 4.9 kg/t of a mixture (all in blowable grain size) of 30% by weight CaO (soft burnt), 50% by weight $Na_2CO_3$ and 11.5% by weight $CaCO_3$ was used which was admixed with 5.0% by weight of an oil corresponding to the heating oil HEL. The blowing rate was 49 kg/t. An end content Se of 0.005% (α value=1.3) and a phosphorus content of 0.035% was achieved.

The performance capability of the agent in accordance with the invention becomes clear from the comparison of the α values from examples 2 to 5 with the α value from the standard example 1. The α value can thus be lowered by 76, 73, 71 or 68%, which is directly reflected in the consumed desulfurization agent and thus in the costs. The agent in accordance with the invention is suitable for the treatment of molten metals, in particular pig iron melts, preferably in accordance with the monoprocess, but also for stirring in according to the KR stirring system.

The agent in accordance with the invention is in particular suitable with a paraffinic oil portion for the desulfurization and deoxidization and inoculation of steel and cast iron.

In the examination of the application potential of the agents in accordance with the invention, properties were surprisingly found which are important for the production of metal, in particular iron. It was thus shown that the reduction in the direct reduction procedures could be noticeably improved when an agent in accordance with the invention is introduced into the region of the reduction zone in the shaft furnace or into the swirl chamber on a direct reduction. The direct reduction with the usual gases (reform gas) slows down the reduction, in particular with larger units. The agent in accordance with the invention can accelerate the direct reduction here. Improvements by 15 to 25% can be achieved, with 5 to 10% of the reducing components being replaced by the agent in accordance with the invention.

It was able to be observed that the disadvantageous swelling of the fine ores in direct reduction processes is suppressed or at least reduced; the degradation of the ore grains during the reduction is avoided or reduced. The "baking onto" the wall or the treatment chamber in the reduction region is equally avoided or suppressed. This can also be suppressed by lime simultaneously introduced into the ladle or by other combinations of slag formers.

The improvement in the flue gas desulfurization in the higher temperature range of the bituminous gas due to the addition of an agent in accordance with the invention was equally surprising. The desulfurization is more comprehensive than in the conventional method since the CaS can be deposited quickly.

The invention claimed is:

1. A process for dephosphorization of a pig iron melt comprising: blowing in, stirring in or adding under conditions for dephosphorization a grained agent into a treatment vessel containing pig iron, wherein the agent at least contains calcium oxide, and either i) bitumen in a quantity of 1 to 30% by weight or ii) a mineral oil and/or paraffinic oil, in a quantity of 1 to 25% by weight.

2. The process in accordance with claim 1, wherein the agent further comprises at least one further element in an elementary and/or bound state, said at least one further element being selected from the group consisting of alkaline metals, alkaline earth metals and earth metals.

3. The process in accordance with claim 1, wherein the agent additionally contains at least one further element in the elementary and/or bound state selected from the group consisting of calcium carbide, calcium cyanamide, calcium hydroxide, calcium carbonate, calcium sulfate, dolomite, barium oxide, barium sulfate and alkaline carriers.

4. The process in accordance with claim 1, wherein the agent additionally contains an agent for improving flowability of said agent.

5. The process in accordance with claim 4, wherein the agent for improving the flowability is selected from the group of members consisting of saturated, monounsaturated and polyunsaturated hydrocarbon compounds.

6. The process in accordance with claim 5, wherein the hydrocarbon compound is selected from the group of members consisting of a paraffin, a paraffinic oil and an oil in the form of refinery oils having a dynamic viscosity of less than 5 $mm^2/s$.

7. The process in accordance with claim 1, wherein the content of bitumen has a sulfur content of less than 1% by weight.

8. The process in accordance with claim 1, wherein bitumen is present in the agent in a quantity of 1 to 15% by weight.

9. The process in accordance with claim 1, wherein bitumen is present in the agent in a quantity of 2 to 6% by weight.

10. The process in accordance with claim 1, wherein the agent contains bitumen in a quantity of 1 to 15% by weight and further contains a member selected from the group consisting of aluminum, titanium, boron and an element selected from the group of metals of rare earth in a quantity of 85 to 99% by weight.

11. The process in accordance with claim 1, wherein the calcium oxide and the bitumen are present as milled, blowable grain having a grain size of <0.01 to 10 mm.

12. The process in accordance with claim 2, wherein the calcium oxide and the bitumen are present as milled, blowable grain having a grain size of <0.01 to 10 mm.

13. The process in accordance with claim 1, wherein the calcium oxide and the bitumen are present as a composite component.

14. The process in accordance with claim 2, wherein the calcium oxide and the bitumen are present as a composite component.

15. The process in accordance with claim 1, wherein the mineral oil and/or paraffinic oil has a kinematic viscosity of less than 20 $mm^2/s$.

16. The process in accordance with claim 1, wherein the mineral oil and/or paraffinic oil has a kinematic viscosity of less than 4.5 $mm^2/s$.

17. The process in accordance with claim 1, wherein a saturation value for calcium oxide in said mineral oil and/or paraffinic oil is not exceeded.

18. The process in accordance with claim 1, wherein a saturation value for calcium oxide and of a further component containing calcium or alkali in said mineral oil and/or paraffinic oil is not exceeded.

19. The process in accordance with claim 1, wherein $Na_2CO_3$ or a sodium silicate of $Na_2O.SiO_2$ is used as an alkaline component.

20. The process in accordance with claim 1, wherein at least one of the members of the group consisting of CaO, $Ca(OH)_2$ and calcium carbonate is added.

21. The process in accordance with claim 1, wherein the fine-grained agent is blown and stirred into a melt bath using a transport gas.

22. A process for dephosphorization of a pig iron melt comprising: blowing in, stirring in or adding a grained agent into a treatment vessel containing pig iron, wherein the agent at least contains calcium oxide, and bitumen in a quantity of 1 to 30% by weight.

23. A process for dephosphorization of a pig iron melt comprising: blowing in, stirring in or adding a grained agent into a treatment vessel containing pig iron, wherein the agent at least contains calcium oxide, bitumen in a quantity of 1 to 30% by weight, and an alkaline carrier in a quantity of 10 to 15% by weight.

* * * * *